INVENTOR.
David A. Weinstein
BY
Attorneys

INVENTOR.
David A. Weinstein
Attorneys

Nov. 16, 1965  D. A. WEINSTEIN  3,218,628
TEMPERATURE ENCODER
Filed Dec. 21, 1961  6 Sheets-Sheet 4

INVENTOR.
David A. Weinstein
BY
Attorneys

INVENTOR.
David A. Weinstein
BY
Attorneys

INVENTOR.
David A. Weinstein
BY
Attorneys

United States Patent Office 3,218,628
Patented Nov. 16, 1965

3,218,628
TEMPERATURE ENCODER
David A. Weinstein, El Sobrante, Calif., assignor to Shand and Jurs Co., Berkeley, Calif., a corporation of California
Filed Dec. 21, 1961, Ser. No. 161,112
11 Claims. (Cl. 340—347)

This invention relates to an encoder which employs a balanced bridge to encode an analog electrical reading such as the resistance of a temperature variable resistor and to provide a digital output determined by that analog reading.

While the encoder is herein described as related to temperature, it will be obvious that the encoder may also be utilized to read and encode other functions, such as pressure, flow, liquid level, electrical current flow, and the like.

In general, the encoder herein described is primarily designed for use with the system as described in application, Serial No. 100,920, filed April 5, 1961, in the names of Bernard T. Wilson, et al., entitled "Telemetering Apparatus System and Method," and assigned to a common assignee. However, the encoder may be employed with other and similar systems or even with systems of a totally different nature as will become obvious upon reading of the description hereinafter.

In encoding systems of the prior art, there is ordinarily included an analog variable component such as, for instance, a temperature variable resistor together with a calibrated or scanning variable resistance which is varied in a predetermined manner. Also, a null detecting circuit is provided to determine when the analog varying resistance and the scanning resistance are either equal or proportionate in a defined manner. Such systems ordinarily employ a servo unit of some type which serves to vary the scanning resistance until the predetermined equalization or proportion is reached.

Economic servo units, however, have certain inherent disabilities which prevent a totally accurate reading of the analog function. One of the primary difficulties in such servo units is their inability to stop exactly at the equalization point. In other words, upon equalization of the scanning resistance and the analog varying resistance, the servo signal is cut off but the inertia of the mechanical portion of the system continues to drive the scanning resistor a slight amount. In order to prevent such slight variation, the circuitry involved is complex and is necessarily expensive and cumbersome.

Moreover, in systems employing servo units, when the equalization or null position of the scanning resistance is approached, the approach may be from either of two directions. Due to the mechanical tolerances, the back lash of the mechanism itself provides still another error dependent upon the direction from which null is approached.

With systems in accordance with the prior art, then, ambiguous readings may be obtained due to the slight inertial coasting of the mechanism after the servo signal is cut off. Thus, with a coded disc rotated in unison with the scanning resistance, the wipers used in conjunction with the coded disc frequently contact two adjacent readings on the disc whereby the output reading is ambiguous.

In general, it is an object of this invention to provide an improved system for converting analog reading into digital information.

It is another object of this invention to provide a system of the above character which is compatible with equipment presently in use.

Another object of this invention is to provide a system of the above character which is placed in operation by the selection of an analog unit to be read.

Another object of this invention is to provide a system of the above character wherein the digital information is translated into a series of pulses.

Another object of this invention is to provide a system of the above character in which a single bridge circuit and scanning potentiometer are employed to measure several unknown values.

It is another object of this invention to provide a system of the aforementioned character in which the digital information transmitted is determined by serially reading a code disc positioned in accordance with a balanced position of a scanning potentiometer.

Another object of this invention is to provide a system of the aforementioned character wherein a reversible motor drives a scanning potentiometer until an A.C. bridge circuit provides an output having a predetermined phase relationship with a reference signal.

It is another object of this invention to provide a system of the aforementioned character wherein said reversible motor always completes its cycle of operation in the same rotary direction.

A further object of this invention is to provide a system of the aforementioned character wherein said reversible motor has a fast and a slow speed and wherein the motor always completes its cycle in the slow speed.

Another object of this invention is to provide a system of the aforementioned character wherein analog information is translated into digital form by the rotation of a commutator disc and wherein the commutator disc together with other portions of the system include means for preventing the output of information until the commutator disc is at a non-ambiguous reading position.

These and other objects and features of the invention will become more clearly apparent upon a review of the following description in conjunction with the accompanying drawing, in which.

Figures 1, 5:
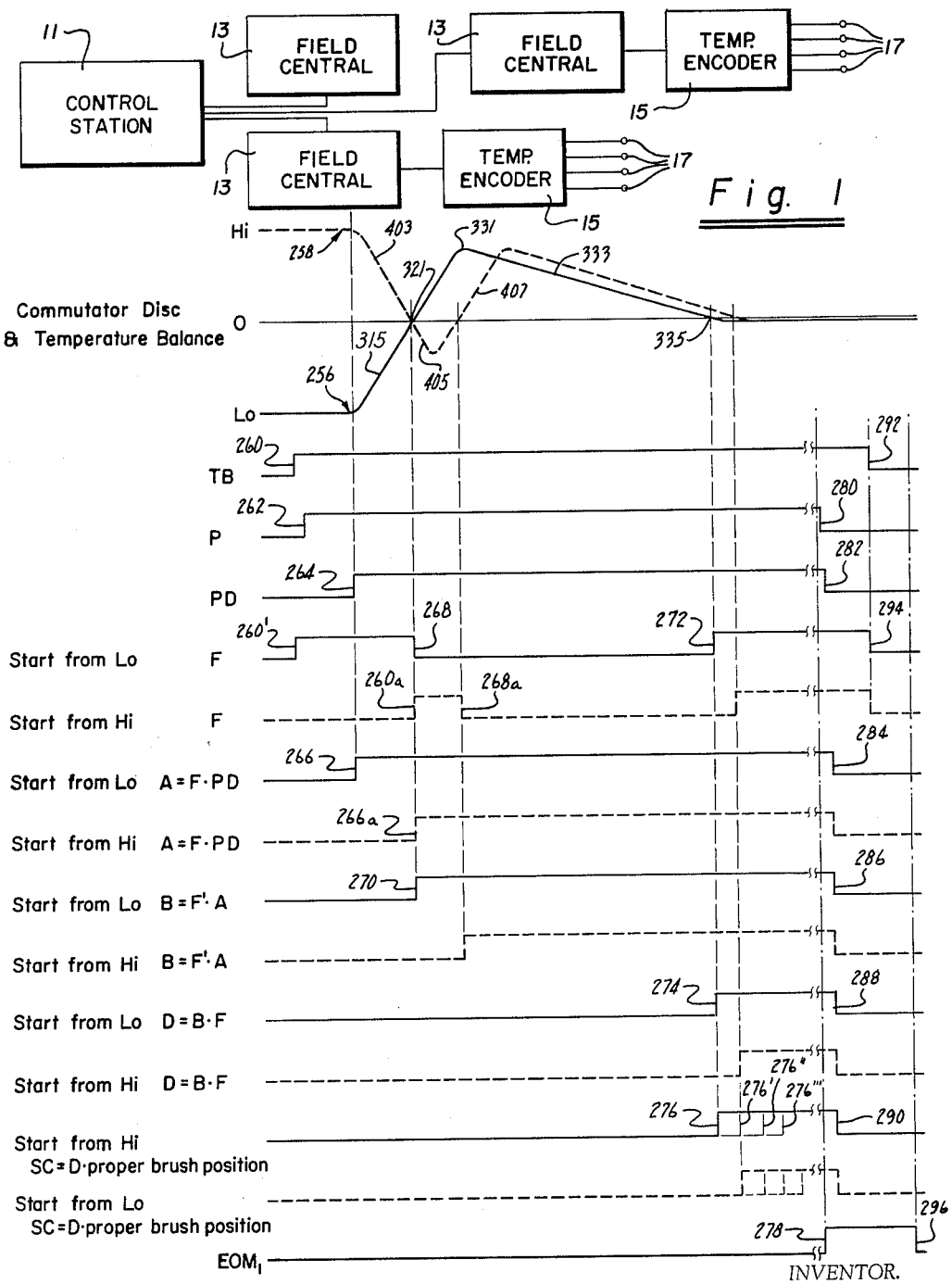
FIGURE 1 is a block diagram of an overall telemetering network employing a temperature encoder system in accordance with this invention.
FIGURE 5 is a timing chart showing the time relationship of the various relays in the circuit of FIGURES 2A and 2B.

Referring to FIGURE 1, there is shown a central control station 11 which may be connected to a plurality of field central stations 13 in accordance with the teaching of said copending application Serial No. 100,920. To one or more, or even to all of the field centrals there may be connected a temperature encoder 15 in accordance with this invention. A single temperature encoder 15 associated with a field central 13 may accommodate a plurality of temperature sensitive bulbs 17.

The system for employing the temperature encoders 15 and the bulbs 17 in accordance with this invention need not be identical to that described in said copending application but may include any system wherein a particular one of several addresses may be selected for operation. The description of the temperature encoder herein, however, is directed to an encoder which is adapted for use with the system in said copending application.

Briefly, the requirements of a system for operation with the temperature encoder in accordance with this invention requires an address selector which may select one of several temperature bulbs 17. Moreover, the system should be capable of supplying to the temperature encoders 15 a series of pulses which may be utilized by the encoder to drive its scan motor as will be described hereinafter. Moreover, the system should include an information line by which the information of the various bulbs 17 may be related back and reviewed by an observer.

Figure 2A:
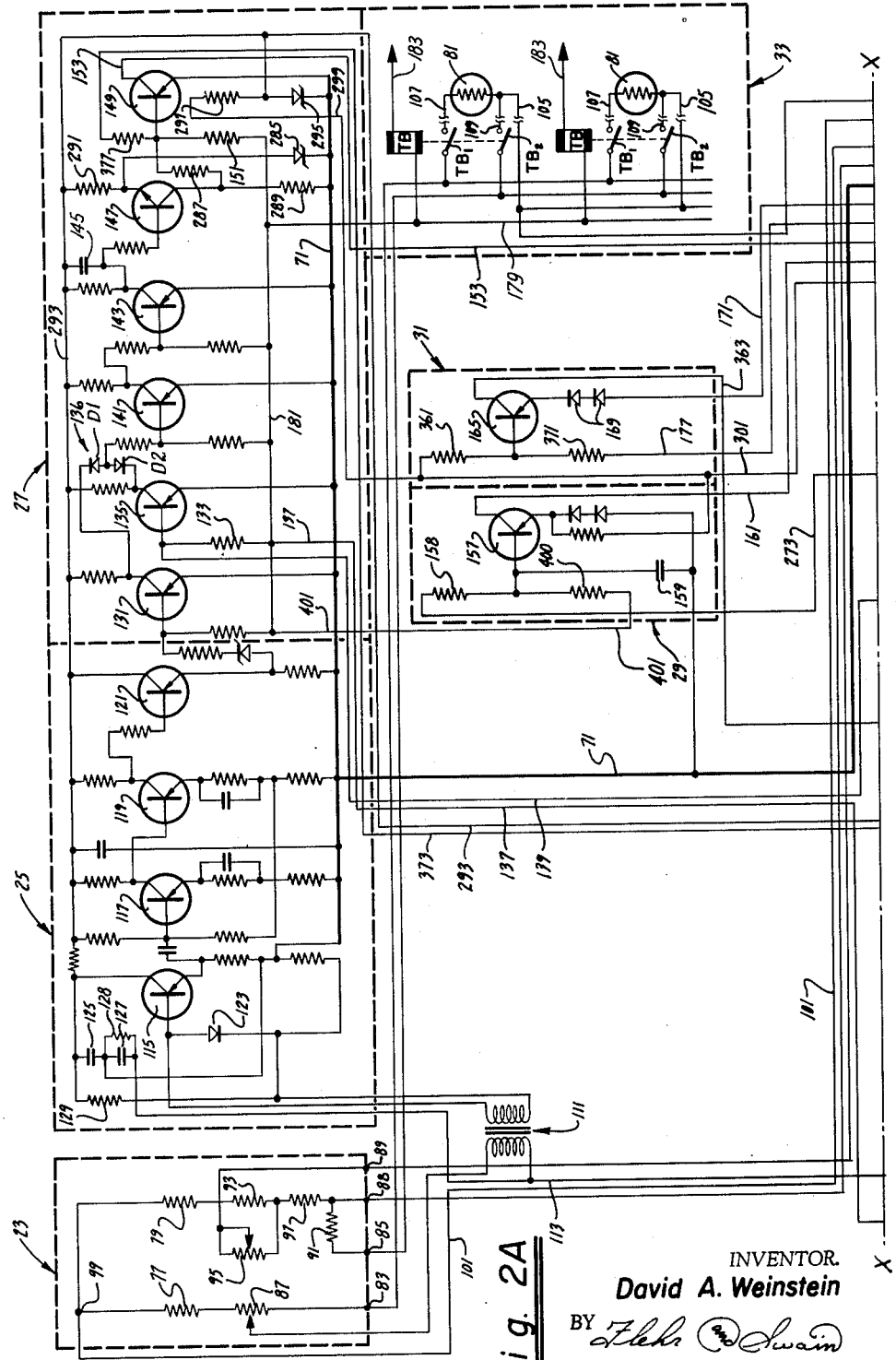
FIGURES 2A and 2B are together a schematic diagram of the circuitry in one embodiment of the invention.
Figure 2B:
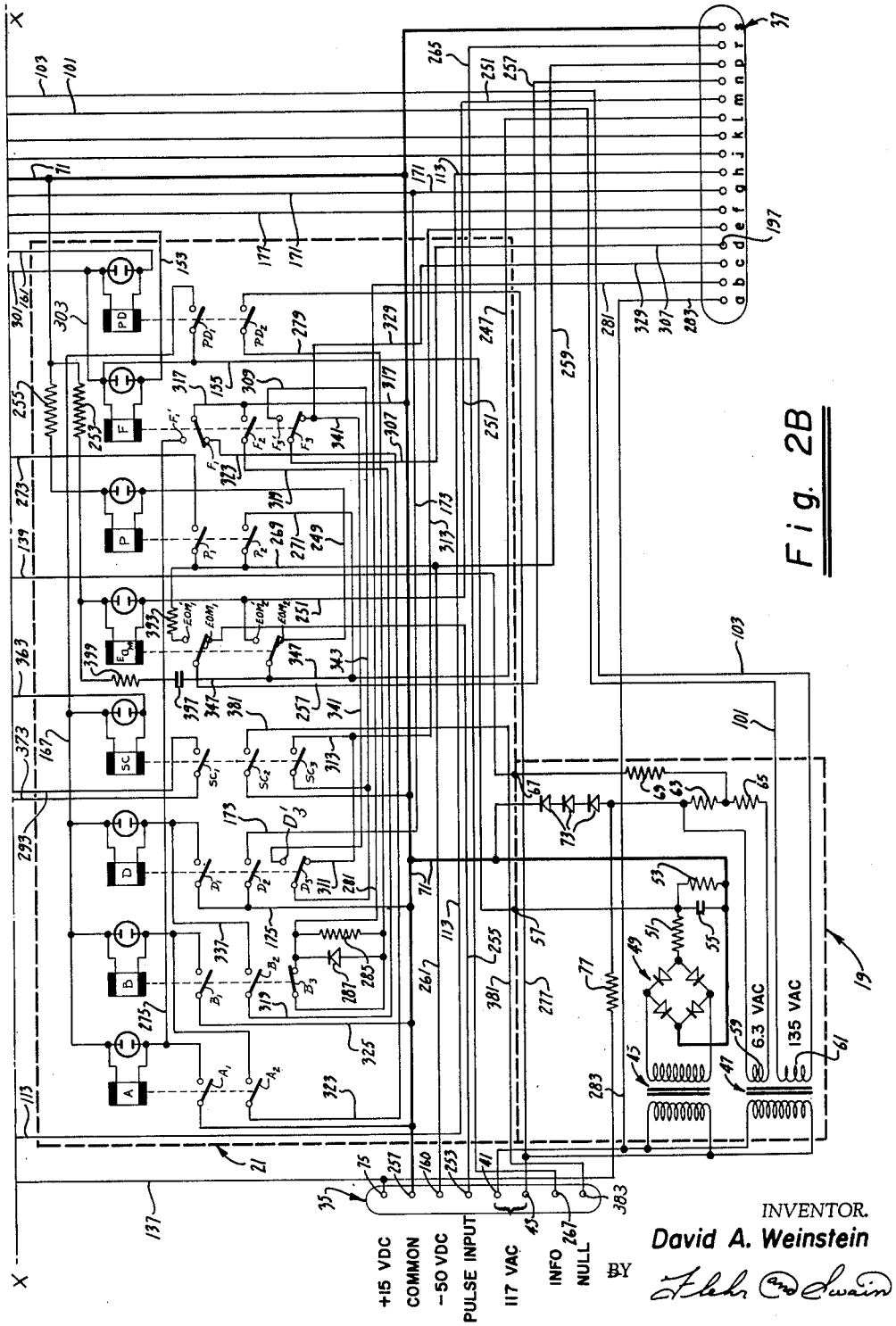

Referring to FIGURES 2A and 2B, which are considered as joined together along the line x—x, the general circuit of a preferred encoder in accordance with this invention is shown. It is noted that the encoder circuitry includes a power supply 19, a relay bank 21, and a bridge circuit 23. Moreover, the system includes an amplifier 25 for the output of bridge circuit 23 and a phase detecting and amplifying circuit 27. In addition, there are included drivers 29 and 31 for certain of the relays in the bank 21. A bank 33 of temperature bulbs is shown as including only two temperature bulbs 81, but may, in accordance with the invention, include any number of bulbs.

Figure 3:
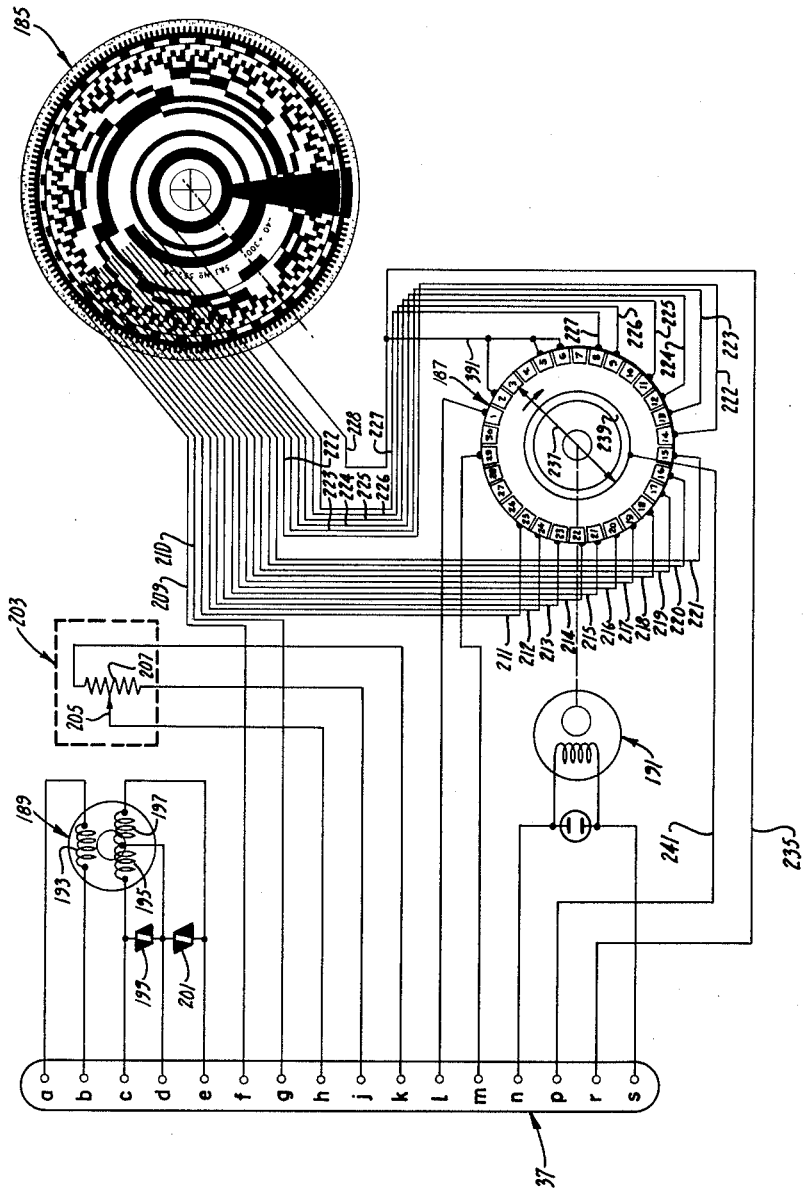
FIGURE 3 is a schematic diagram of the circuitry connecting the motors and commutator discs to the circuit of FIGURES 2A and 2B.

In addition, the system includes a terminal block 35 for connection between the temperature encoder and the field central 13 as shown in FIGURE 1. A second terminal block 37 is shown in both FIGURES 2 and 3 thereby indicating the connections between the two figures The circuit shown in FIGURE 3 is associated with the drive motors and commutator discs.

A source of A.-C. voltage is connected to terminals 41 and 43 of the terminal block 35. The hot side of the A.-C. line is connected to the terminal 43, while the neutral side is connected to the terminal 41. The A.-C. is applied across the primaries of transformers 45 and 47 in the power supply 19. The secondary of the transformer 45 is connected to a rectifying bridge 49, the D.-C. which is connected across a filter circuit including the resistors 51 and 53 and the capacitor 55. The transformer 45 and the filter circuit are selected such that voltage at the terminal 57 is −25 volts D.-C.

The transformer 47 includes two secondaries 59 and 61. The secondary 59 provides a 6.3 volt A.-C. and is applied to a voltage divider including resistors 63 and 65 to provide approximately 2.5 volts across the resistor 63.

The junction of the resistors 63 and 65 is connected to a terminal 67 through a resistor 69. The opposite side of the resistor 63 is connected to a common ground line 71 through the series diodes 73. The junction between the resistor 63 and the diode 73 is connected through resistor 77 to a terminal 75 on the terminal block 35 which is a source of +15 volts D.-C. Thus, between the line 71 and 67, there is impressed an A.-C. voltage across the resistor 63 which may be in the order of 2.5 volts A.-C. together with the voltage drop across the series diodes 73 which may be in the order of +2 volts D.-C. The line 71 then bears a D.-C. relationship to the terminal 67 plus two volts D.-C., as will be explained more fully hereinafter.

The secondary 61 of the transformer 47 provides approximately 135 volts A.-C. which is employed in the bridge 23 as will be described more fully hereinafter.

Referring to the relay bank 21, there are eight relays; the various relays are nominally designated A, B, D, SC, EOM, P, F and PD. The functions of each of these relays will be described more fully hereinafter but generally the P relay may be considered the power relay which recognizes that the temperature encoder is to be utilized. The PD, or power delay, relay serves to control the power to various other relays and to the A.-C. motor. The power delay relay PD is provided to eliminate the possibility of transient originated switching. The phase detector or F relay serves to cause the rotation of the commutator motor to be in the proper direction dependent upon which side of balance the wiper of the scanning potentiometer is located. The A and B relays, together with the phase detector relay F, serve to determine that null has been passed and from which direction.

The digitize relay D serves to prime the system to indicate that null has been reached and that a reading should be taken if the wipers of the code disc are in a non-ambiguous position. The scan command relay SC serves to indicate that the code commutator disc is on a non-ambiguous position and commands that a reading should be taken. The final relay in the bank, the end of message relay EOM, serves to ensure that an "end of message" signal is forwarded to the field central 13 (FIGURE 1) after the reading and information transmission is complete. The end of message relay, EOM, also serves to ensure that the read-out scanner is returned to its home position.

It is noted that the contacts for the various relays in the bank 21 are designated by the reference letters for the particular relay together with a sub-script numeral indicating the particular contact of that relay. In instances where back contacts are used, the normally open contact is designated by a prime such as indicated in contact $D_3'$.

The bridge circuit 23 includes upper legs 77 and 79. One lower leg of the bridge comprises a preselected one of the temperature bulbs 81 in the temperature bulb bank 33. The temperature bulb 81 is connected between the points 83 and 85. A potentiometer 87 is connected between the point 83 and the leg 77 and serves to provide a fine zero setting for the bridge. A scanning potentiometer (to be explained hereinafter) is connected between the points 88 and 89 through the terminal points $k$ and $j$ on the terminal 37. A resistor 91, connected between the terminals 85 and 88, serves as a rough zero setting for the bridge.

A resistor 93 and potentiometer 95, in parallel therewith, provide coarse and fine range adjustment, respectively, for the bridge. A resistor 97 is provided to prevent shorting, by a low resistance of the potentiometer 95, of the scanning potentiometer placed across the terminals 88 and 89.

An A.-C. input is applied to the bridge circuit 23 on one side to the terminal 99 through the line 101 from the secondary 61 of the transformer 47. The opposite side of the bridge is supplied from the secondary 61 through lines 103 and 105 to a temperature bulb 81. (The selection of a particular one of the temperature bulbs 81 will be described hereinafter.) The line 105 is coextensive with the lines 107 and 109 connected to the temperature bulbs 81 in order to equalize resistance variations which may be caused by the resistance of the lines 107 and 109; it being realized that the temperature bulbs 81 may be located relatively long distances from the remainder of the temperature encoding system.

The output of the bridge circuit 23 is applied to a transformed 111. The wiper of the potentiometer 87 is connected to one side of the primary of transformer 111, and the wiper of the scanning potentiometer is connected to the other side through the line 113 and the point $h$ of the terminal 37.

From the secondary of the transformer 111, the output of the bridge circuit is applied as an input to the amplifier 25 having four stages of amplification including the transistors 115, 117, 119 and 121. A diode 123 is employed in the input to provide clamping for the input signals of one polarity. The base emitter junction of the transistor 115 provides clamping action for the other polarity. A circuit including the capacitors 125 and 127 together with the resistor 128 is provided to compensate for voltage drift on the output of the transformer 111. The resistor 129 provides bias to the transistor 115.

The output stage 121 of the amplifier is applied as an input to the transistor 131 of the phase detector 27. These pulses are sufficiently strong to saturate the transistor 131 whereby its output is substantially a square wave. A reference signal is applied between the base and emitter of transistor 135.

As stated hereinabove, the voltage between the line 71 and 67 includes approximately a +2 volt D.-C. together with approximately 2.5 volts A.-C. from the secondary 59 on the transformer 47. Thus, the negative driving halfwave of the reference signal is a relatively narrow pulse. In addition, the time spacing between the negative pulses is considerably more than the time width of the pulses themselves although the frequency of the reference signal remains at the input frequency of the A.-C. power supply. In addition, the pulses supplied to the base of transistor 135 are sufficiently strong to saturate the transistor whereby the output of the transistor 135 is substantially a rectangular wave having off-time significantly longer than the on-time.

The output of the transistors 131 and 135 is applied to an AND gate 136 including the diodes D1 and D2. Thus, the squared signal from the bridge is applied to the diode D1, while the squared peaks of the reference signal are applied to the diode D2. It is apparent that if the squared peaks of the reference signal occur in time simultaneous with the pulse from the bridge circuit, the AND gate 136 will produce an output.

By using only the peaks of the reference signal rather than full half cycles thereof, the short time of the reference pulse effectively reduces the possible error in the AND gate 136. In effect, if the full half cycle of the reference signal were employed, the AND gate 136 would produce an output even if the signal from the bridge were substantially out of phase with the reference signal. For instance, if the bridge circuit signal were 170° out of phase from the reference signal, there would be a 10° overlap of the reference signal and the signals on the bridge circuit. On the other hand, by reducing the time length of the reference signal, such an output does not occur unless the reference signal and the signal from the bridge are within phase at least to the degree determined by the time length of the reference signal pulse.

The output of the AND gate 136 is amplified by the transistors 141 and 143. The output of the transistor 143 is applied to a capacitor 145 which, when charged, turns the NPN transistor 147 on.

The transistor 149 is normally biased "off" through the high impedance resistance 151 connected to the +15 volt terminal 75, through lines 181 and 137. However, upon the conduction of transistor 147, the transistor 149 is turned "on" and energizes the F relay through the line 153, the other side of the F relay being connected to the −25 volt terminal 57 through the line 155.

The driver 29 includes a transistor 157 which is employed to activate the power delay relay PD. The base circuit of the transistor 157 includes a capacitor 159 which begins to charge to −50 volts through the resistor 158 and the line 273 to the terminal 160 of the terminal block 35 through contact P1 immediately upon activation of the P relay. As the capacitor 159 becomes charged, the transistor 157 is turned "on" to substantially ground one side of the PD relay through the line 161. The other side of the PD relay is connected to the −25 volts terminal 57 through the lines 303 and 155.

The driver 31 includes the transistor 165 and is employed to activate the scan command relay SC. One side of the SC relay is connected to the −25 volt terminal 57 through the line 167, the relay terminals PD₁ and the line 155. Upon conduction of the transistor 165, the other side of the SC relay is effectively connected to ground through the diodes 169, the lines 171 and 173, the D₂ contacts (if closed), and the line 175. Thus, upon activation of the digitize relay D, the SC relay may be activated. However, it will be noted that the base-emitter circuit of the transistor 165 is connected to the points f and g of the terminal 37 by means of the lines 177 and 171, respectively. As will be seen hereinafter, the points f and g are shorted upon the occurrence of certain conditions thereby completely inactivating the transistor 165 to prevent operation of the SC relay. The diodes 169 in the emitter circuit of the transistor 165 serve, in conjunction with the emitter-base junction of the transistor 165, to provide a bias on the emitter whereby nonconduction is assured when the points f and g are shorted even though the transistor may be hot.

The bank 33 of temperature bulbs 81 is shown in FIGURE 2 as including two temperature bulbs 81. However, the number of bulbs may include any desired number limited only by the capabilities of the field central station 13 as shown in FIGURE 1. Each of the temperature bulbs 81 includes the hereinbefore mentioned lines 105, 107 and 109 which run substantially coextensive from the temperature encoder unit. Associated with each of the bulbs 81, there is a temperature bulb relay TB having contacts TB₁ and TB₂. Upon operation of a selected one of the TB relays, its respective contacts TB₁ and TB₂ are closed thereby completing the circuit of the selected temperature bulb 81 across the terminals 83 and 85 to the bridge circuit 23.

As is apparent, one side of the temperature bulb relays TB is connected to the +15 volt D.-C. line through the terminals 75 through the lines 179, 181 and 137. The other side of the temperature bulb relays TB are connected through the lines 183 to the field central unit 15.

Selected ones of the temperature bulb relays TB are energized by selectively grounding a particular one of the lines 183 in the field central.

Referring to FIGURE 3, the remainder of the circuit of the temperature encoder may be viewed. The particular portion of the circuit, as shown in FIGURE 3, is related primarily to the commutator disc 185, the scan disc 187 and the respective motors 189 and 191 for driving the two discs. The circuit of FIGURE 3 also shows the terminal 37 which is considered connected to the same as the terminal 37 of FIGURE 2. The various points of the terminal 37 in each figure bear the same letter designations.

The commutator disc motor 189 includes a field winding 193 connected across the points a and b of the terminal 37. The motor 189 also includes shading pole windings 195 and 197 which are connected across the points c–d and d–e, respectively. Varistors 199 and 201 are connected across each of the shading poles 195 and 197 to provide spark suppression. A scanning potentiometer 203 has its wiper 205 connected to the point h, while the resistance portion 207 is connected across the points j and k which, in turn, are connected to the terminals 88 and 89 of the bridge circuit 23 as shown in FIGURE 2. The wiper 205 is connected to the bridge circuit 23 by the line 113 to one side of the primary of the transformer 111.

The commutator disc 185 includes a number of concentric channels each associated with an individual wiper brush and associated lead line 209 to 228.

Figure 4:
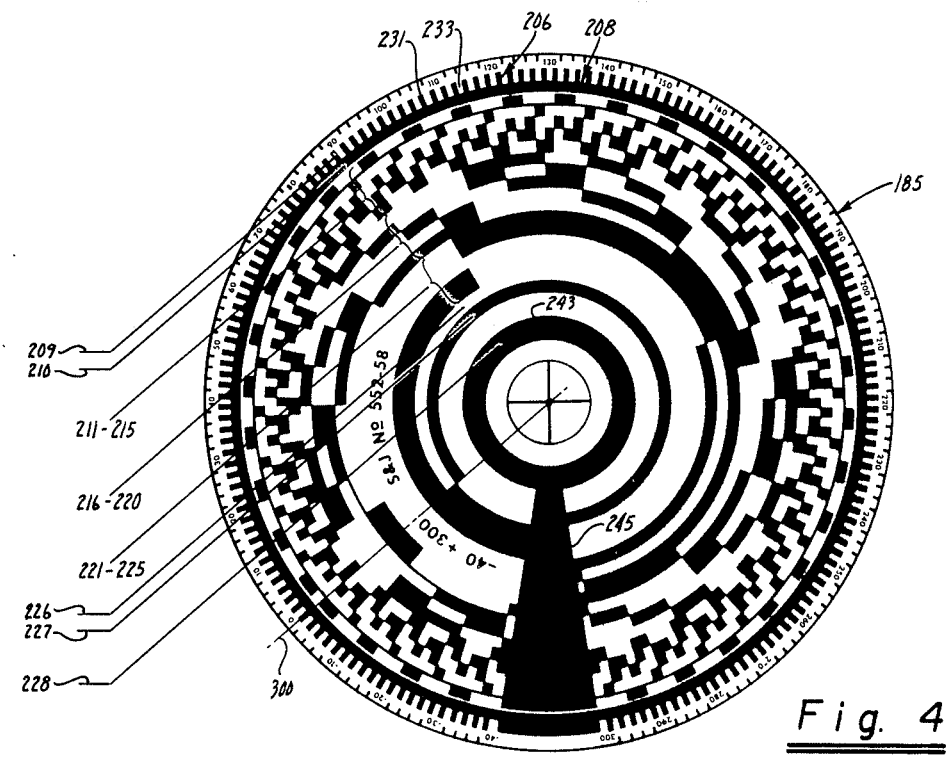
FIGURE 4 is an enlarged view of a commutator disc as shown in FIGURE 3.

As can be seen more clearly in FIGURE 4, the wipers 209 and 210 are associated with the outermost channels 206 and 208 of the commutator disc 185. The outer channel 206 includes a series of conductors 231 alternated with a series of non-conducting spaces 233. The channel 208 associated with the wiper 210 is a continuous strip of conductive material whereby upon rotation of the commutator disc, the wipers 209 and 210 are alternatively connected and disconnected. The wipers 209 and 210, as can be seen in FIGURE 3, are connected to the points f and g of the terminal 37.

The scan disc 187 serves to translate information held in parallel on the commutator disc 185 into serial information to be transmitted along the information line 235 to the point r of the terminal 37. The scan disc 187 includes a rotatable wiper 237, one end of which is in continual contact with a conductive strip 239 and from thence through the line 241 to a source of −50 volts to the point p of the terminal 37. The scan disc wiper 237 is rotated by means of the scan motor 191 which, in turn, is activated by a series of pulses received from the field central 13 (FIGURE 1) at the point n. The other side of the scan motor is connected to ground through the point s of the terminal 37.

The outer periphery of the scan disc 187 includes the series of conductive points numbered 1 to 30, each of which corresponds with a position of the wiper 237 after successive stepping actions.

Referring to FIGURES 3 and 4 together, it is noted that the wiper 227 is connected to the scan disc point 8 while the wiper 226 is connected to the scan disc point 9. The associated channels on the commutator disc 185 correspond, in the embodiment described, to plus or minus temperatures. Thus, when the wiper 227 is in contact with conductive material on the disc 185, a positive temperature is indicated and, alternatively, when the wiper 226 is in contact with a conductive section of the disc, a negative temperature is indicated.

The commutator disc wipers 221 to 225 cooperate with the next outer adjacent channels and are connected to the scan disc points 11 through 15, respectively. The wipers 221 to 225 are used to indicate the "hundred" digit of the temperature reading. The next adjacent five channels cooperate with the wipers 216 to 220 which, in turn, are connected to the scan disc points 16 through 20. These channels, wipers and points serve to indicate the "tens" digit of the temperature reading. The next five adjacent channels cooperate with the wipers 211 to 215 which, in turn, are connected to the scan disc points 21 to 25 to indicate the "units" digit of the temperature reading.

The wiper disc 228 cooperates with a continuous conductor 243 on the commutator disc. The conductor 243 is connected through the wedge shaped portion 245 to each and every conductive portion on the commutator disc 185 with the exception of the two outermost channels 206 and 208. The wiper 228 then may serve as an output from the commutator disc and may be connected to the point r through the line 235.

In addition, certain of the scan disc points, that is, points 2, 5 and 6, may be connected directly to the output information line 235. The points 2 and 5 may serve as a code indication that a temperature reading is to follow. Thus, the temperature reading code is indicated as "01001" in a "two out of five" binary code.

Scan disc point 6 may be employed as an information bit which is common to both of the temperature information bits (that is, the information from the scan disc points 8 or 9) to again provide a "two out of five" code. Thus, a positive temperature will be coded as "10100" and negative temperature as "10010".

In addition, the scan disc point 1 is connected to the point 1 of the terminal 37, while the scan disc point 29 is connected to the point m. As can be seen in FIGURE 2, the point 1 is connected to actviate the power relay P through the lines 247, the closed contacts EOM₂, and the line 249.

The point m of terminal 37 is connected to activate the end of message relay EOM through the line 251. The other side of both the power relay P and the end of message relay EOM is connected to ground through the resistors 253 and 255, respectivley.

Operation of the temperature encoder as hereinbefore described may best be understood by a review of the circuit diagrams of FIGURES 2 and 3 in conjunction with the timing chart of FIGURE 5. Referring particularly to the timing chart of FIGURE 5, there is shown in solid lines a curve 256 indicating the position of the commutator disc 185 (which is on the common shaft with the scanning potentiometer 203 and the commutator motor 189) relative to the position of that disc required to balance the bridge 23. The position of the disc for balance is shown as zero.

Thus, on the curve 256, the solid line on the lefthand side indicates that the actual position of the commutator disc will give a reading which is low compared to what it should read for balance between the scanning potentiometer 203 and the particular temperature bulb 81 selected. Conversely, the dashed curve 258 indicates a high position of the commutator disc.

The various curves in FIGURE 5 indicate the operation of the particular relays included in the circuit. Certain of the relays TB, P, PD and EOM are identical whether the commutator disc position starts from high or low position. However, the operation of relays F, A and B varies somewhat dependent upon whether the commutator starts from the high or low position. The relays D and SC operate in the same manner whether the commutator disc starts from the high or the low position. However, in the particular presentation shown with two examples of commutator disc and temperature balance, it is noted that the final null or zero balance varies in time dependent upon whether it actually starts from a high or low position. Thus, alternative curves are shown for the D and SC relays.

It may be assumed that the field central 13 (FIGURE 1) has selected a particular one of its addresses corresponding to a particular temperature bulb. Upon this recognition, the field central will ground the selected line 183 to energize one of the TB relays (shown at 260 in FIGURE 5) and place the selected temperature bulb in the bridge circuit 23.

When a particular bulb 81 is selected by the field central 13, A.-C. is then connected across the bridge circuit 23. One side of the A.-C. line is continuously connected to the terminal 99 of the bridge circuit through the line 101. The other side of the A.-C. line being connected through the lines 103 and 105 to the temperature bulb 81 upon energization of a temperature bulb relay TB. The opposite sides of the temperature bulbs 81 are connected to the bridge circuit through the lines 107 and 109, and the relay contacts $TB_1$ and $TB_2$, to the bridge terminals 83 and 85. Thus, the bridge is activated.

The connection of the transformer 111 is chosen such that when the commutator disc and consequently the scanning potentiometer 203 are on the low side of balance, the bridge output is in phase with the reference signal applied across the resistor 133. Thus, the signal from the bridge is amplified in the amplifier 25 and produces an output from the transistor 131 to the diode D1 in phase with the output from the transistor 135 thruogh the diode D2. Since the signals are in phase, the AND gate 136 produces an output and the transistors 141 and 143 are turned off and on respectively. With the transistor 143 turned on, the capacitor 145 is charged to ground whereby the n-p-n transistor 147 is turned on. The emitter of the n-p-n transistor 147 is held at a predetermined negative value by means of a Zener diode 285. The Zener diode may, for instance, be such to hold the emitter of the n-p-n transistor 147 at −10 volts.

The p-n-p transistor 149 is normally held in its non-conducting state by its base connection to the +15 volt D.-C. terminal 75 through the resistor 151 and the lines 181 and 137. However, upon conduction of the n-p-n transistor 147, the base of the transistor 149 is connected through a resistor 287 to a voltage divider including the resistor 289, transistor 147 and resistor 291. This voltage divider is connected to the common ground line 71 and the line 293. The line 293 is held at a predetermined negative voltage by means of a Zener type diode 295 which is connected in series with the resistor 297 between common lines 71 and the −25 volt D.-C. terminal 57 of the power supply. The connection of the resistor 297 to the terminal 57 is through the lines 299 to 301, 303 and 155. Thus, the transistor 149 is turned on and one side of the phase detector relay F is thereby connected to ground through the transistor. This connection to ground is from the lower side of the phase detector relay through the line 153 and the transistor 149 to the common ground line 71. Thus, it is noted when the commutator disc 185 and the scanning potentiometer 203 are on the low side of the balance position, the phase detector relay F is energized (shown at 260′ in FIGURE 5) shortly after the selected temperature bulb relay TB is energized.

With the operation of the phase detector relay F, the contacts $F_3'$ are closed whereby the shading pole 197 of the commutator disc motor 189 is shorted out. This short is accomplished from the point $d$ of the terminal 37, the line 307, the now closed contacts $F_3'$, the line 309, the still closed contacts $D_3$, the lines 311 and 313, and the point $e$ of the terminal 37. Thus, the direction of the commutator disc motor 189 is determined. The motor does not yet rotate, however, since the field winding 193 is not yet energized.

In addition, the operation of the phase detector relay F places ground potential on one side of the open contacts $B_2$ through the line 317, contacts $F_2$, line 319 to the left-hand side of the contacts $B_2$.

The opening of contacts $F_1$ causes interruption of the ground connection to the left-hand side of contacts $A_2$, but the simultaneous closing of contacts $F_1'$ connects one side of the A relay to ground. The A relay is not energized, however, since the other side is not yet connected.

In addition to activating one of the temperature bulb relays TB, the field central 13 will begin a series of pulses to the pulse input terminal 253 of the terminal block 35. These pulses will be carried along the line 255, through the closed relay contacts $EOM_1$, line 257, the point $n$ of terminal 37 to the scan motor 191. The other side of the scan motor being grounded through the point $s$ of terminal 37 to the common line 71.

Assuming that the scan disc pointer 237 is in its home position at scan line point 30, the first pulse will move the pointer to the scan disc point 1. Since the other end of the pointer 237 is connected to −50 volts (by means of the line 241, the point $p$ of terminal 37, lines 259 and 261 to the terminal 160), this voltage will appear at the point 1 of terminal 37 which is connected to the scan disc point 1. The voltage at the point 1 is conducted to the power relay P through the lines 247 and 347, closed contacts $EOM_2$ and the line 249. Since the other side of the power relay P is connected to ground through resistor 255, the power relay P is activated (shown at 262 in FIGURE 5) thereby closing contacts $P_1$ and $P_2$.

Pulses to the scan motor 191 from the terminal 253 are arranged to recive in series of five pulses; thus, the scan disc wiper 237 travels across five of the scan disc points thereby giving "temperature code" output through the line 235, point $r$ of the terminal 37 and line 265 to the information terminal 267 of the terminal block 35. Upon receipt of the "temperature code," the field central stops its transmission of pulses.

Upon actuation of the power relay P, the contacts $P_2$ close to lock the power relay on by applying −50 volts from the terminal 160, line 261, line 269, the now closed contacts $P_2$, line 271, still closed contacts $EOM_2$ and line 249. Thus, when the power relay P is turned on, it is locked in the "on" condition (until the end of message relay EOM is activated) even after the wiper 237 of the scan disc passes the scan disc point 1.

Closure of the relay contacts $P_1$ connects the −50 volt source through the line 273 to the base of the transistor 157 and the resistor 158. The negative voltage at the base of the transistor 157 causes that transistor to conduct. The emitter of the transistor 157 is connected to ground through the common line 71 and the collector is connected to a source of −25 volts at the terminal 57 through line 161 and the coil of the power delay PD. Thus, upon conduction of the transistor 157, the power delay relay PD is activated (shown at 264 in FIGURE 5) and remains so activated until the power relay P is deenergized.

By activation of the power delay relay PD, the −25 volt source at the terminal 57 is connected to the A and B relays as well as the digitize relay D and scan command relay SC. However, neither the B, D or SC relays are as yet activated since the other side of each of the relay coils is not, at this point, connected to ground. The A relay, however, is turned on at this time (shown at 266 of FIGURE 5) since the other side thereof is connected to ground through the now closed contacts $F_1'$. The A relay is locked in its energized condition through its own contacts $A_1$. Closure of contacts $A_2$ connects the lower side of the B relay to one side of the contacts $F_1$ whereby upon subsequent deenergization of the phase detector relay F, the B relay will be turned on.

Energization of the power delay relay PD connects, through its contacts $PD_2$, the hot terminal 43 of the A.-C. input to the field winding of the commutator disc motor 189. The connection herein is through the line 277, contacts $PD_2$, line 279, closed contacts $B_3$, line 281 and the point $b$ of terminal 37. The other side of the field winding is already connected to the neutral side of the A.-C. line through point $a$ of the terminal 37 and line 283. Thus, the field winding of a servo motor is energized. Since the contacts $B_3$ short out resistor 285 and diode 387, full A.-C. power is applied to the field 193 of the commutator disc motor 189 whereby the motor is exposed for high speed. The direction of the commutator disc motor 189 is determined by previously mentioned short across the shading pole winding 197 through the contacts $D_3$ and $F_3'$ and is shown in FIGURE 5 by the line 315.

With the commutator scan motor operating in a given direction, the scanning potentiometer 203 eventually reaches and passes a point of balance 321 (FIGURE 5) with the selected temperature bulb. At the time the point 321 is reached, the phase output of the bridge circuit 23 is reversed and the signal amplified by the amplifier 25 and applied to transistor 131 and eventually to diode D1 is out of phase with that signal applied to diode D2. Consequently, the AND gate 136 produces no output, the transistor 141 is turned on and the subsequent transistors 143, 147 and 149 are turned off. By turning transistor 149 off, the phase detector relay F is deenergized (shown at 268 of FIGURE 5) and its contacts revert to the position shown on the drawing.

With the contacts in this position, the A relay remains energized due to its connection to ground through the contact $A_1$. Closure of the contacts $F_1$ causes energization of the B relay (shown at 270 of FIGURE 5) through line 323 and now closed contacts $A_2$ to the bottom of the B relay; it being remembered that the upper side of the B relay is connected through the contacts $PD_1$ to the −25 volt terminal 57.

The short actuation of the B relay causes the relay to be locked on through its contacts $B_1$ which connects the bottom of the B relay to ground through the line 325.

Upon opening the contacts $B_3$ the short circuit across the resistor 285 and diode 287 are removed. Consequently, the A.-C. current applied to the field winding 193 of the commutator disc motor 189 is attenuated and partially rectified and the motor speed is reduced.

Moreover, opening of the contacts $F_3'$ removes the short circuit across the shading pole winding 197. On the other hand, closure of contacts $F_3$ shorts the shading pole winding 195 through line 307, closed contacts $F_3$ and line 329. Consequently, the direction of the commutator disc motor 189 is reversed as is indicated by the knee 331 in the commutator disc and temperature balance curve 256 of FIGURE 5.

Thus, the commutator disc motor 189 continues to operate in a reverse direction at a low speed, as indicated on the curve at 333, until balance condition is again crossed, but this time from the opposite direction as shown at 335. In crossing the balance position from this direction, the bridge 23 and the amplifier 25 again pass to the transistor 131, a signal which is in phase with the reference signal across the resistor 133. Consequently, the AND gate 136 again produces an output and the transistor 149 is again turned on to activate the phase detector relay F, as shown at 272 in FIGURE 5.

Since the contacts $B_2$ are now closed, this energization of the phase detector relay F causes energization of the digitized relay D to be energized (shown at 274 of FIGURE 5) by connecting the lower side thereof to ground through the line 337, contacts $B_2$, line 319, now closed contacts $F_2$ and line 317 to the common ground line 71. The digitize relay is locked in the energized condition through its own contacts $D_1$ and line 175.

Since the contacts $F_3$ are now open, this shorting path for the shading pole winding 195 is removed. However, the now closed contacts $F_3'$ and $D_3'$ cause the short across shading pole winding 195 to be continued. This short is applied from the point $c$ of terminal 37, through line 329, line 341, contacts $D_3'$, line 343, now closed contacts $F_3'$ and line 307 to point $d$ of terminal 37.

In addition, contacts $D_2$ cause the common ground line 71 to be connected through lines 173 and 171 and the diodes 169 to the emitter of transistor 165. The base of transistor 165 is connected to the $-25$ volts terminal 57 through resistor 361, and the lines 301, 303 and 155. The collector of transistor 165 is connected to the $-25$ volt terminal 57 through line 363, the coil of scan command relay SC, line 167, now closed contacts $PD_1$ and line 155. Thus, the scan command relay SC is free to be energized as indicated at 276 in FIGURE 5.

It should be noted here, however, that the emitter and base of transistor 165 are connected through the lines 171 and 177, respectively, to the points $f$ and $g$ of terminal 37. The points $f$ and $g$, in turn, are connected to wipers 209 and 210 (FIGURE 3) associated with the commutator disc 185. Referring particularly to FIGURE 4, it is noted that wiper 210 is in contact with the continuously conductive channel 208, while wiper 209 is associated with the channels 206 including alternate conductive and nonconductive segments.

All of the wipers 209 through 228 contact the commutator disc 185 in a single radial line. Consequently, digital information may be coded on the disc such that a given sector of the disc may correspond to a particular digital reading with each of the wipers contacting a conductive or a nonconductive segment dependent upon the information in that sector. Adjacent sectors, of course, will correspond to different digital readings. The digital reading then would be determined by attempting to pass a current sequentially from each of the wipers to the disc. If, however, the wipers were permitted to span two adjacent sectors, the reading would be ambiguous. This possibility of spanning occurs only on those points of the disc where the various segments meet as shown typically by the line 300 in FIGURE 4. It is at these points in the channel 206 that the conductive segments 231 are located.

If then, the commutator disc is positioned at one of these ambiguous points, the wipers 209 and 210, together with the channels 206 and 208, serve to apply a short circuit across the points $f$ and $g$ of terminal 37. The short circuit across these points serves to short the emitter-base junction of the transistor 165 through resistor 371 and diodes 169. The diodes 169 are biased in the forward direction through the emitter-base junction of transistor 165, thereby placing the emitter of transistor 165 in the negative potential to ensure turning transistor 165 off.

Thus, the scan command relay SC may, after energization of the digitized relay D, be either "on" or "off" dependent upon the actual position of the commutator disc 185 with respect to the wipers 209 to 228. If, at the time the digitize relay D is energized, the commutator disc is in a non-ambiguous position, the scan command relay SC will be energized immediately as shown at 276 in FIGURE 5. If, however, the commutator disc is at an ambiguous position, energization of the scan command relay will be delayed until a non-ambiguous position is reached as shown at 276', 276'' or 276''' of FIGURE 5.

Assuming that the wipers 209 through 228 are in a proper position with respect to the scan command disc 185, the transistor 165 will be conducting and the scan command relay SC will be energized. Energization of the scan command relay closes contacts $SC_1$ which, in effect, places the negative potential from line 293 onto the base of transistor 149 through line 373. Consequently, transistor 149 is maintained "on" independent of the conduction state of the preceding transistor 147. Thus, the phase detect relay F is maintained in an energized condition.

Closure of contacts $SC_3$ shorts the shading pole 197. This short circuit is applied from the point $d$ of terminal 37 through line 307, now closed contacts $F_3'$, line 343, now closed contacts $SC_3$, and line 313 to point $e$.

In addition, the shading pole 195 is still shorted through contacts $F_3'$ and $D_3'$. With both shading poles so shorted, the commutator disc motor 189 is stopped.

Another operation caused by the energization of the scan command relay SC is the connection from the common ground line 71 through contacts $SC_2$ in line 381 to terminal 383 of the terminal block 35. Connecting ground to terminal 383 causes a signal to be applied to the field central 13 whereby pulses are again initiated at terminal 253.

The pulses at terminal 253 are passed along line 255, contacts $EOM_1$ and line 257 to point $n$ of terminal 37. From the point $n$, the pulses are applied to the scan disc motor 191 whereby pulsing rotation of the pointer 237 is re-initiated.

These pulses may take the form of five pulse bursts whereby the pointer is stepped five positions at a time. Each of the various positions of the scan disc pointer 237 correlates the particular channel in the commutator disc 185 through the connections of the various scan disc points to the wipers 211 to 227.

With the initial five pulses, the wiper passes through the scan disc points 6, 7, 8, 9 and 10. It is noted that when it reaches the point 6, $-50$ volts from point $p$ of terminal 37 is passed through the conductive ring 239 through wiper 237, scan disc point 6, line 391, and line 235 to point $r$ of terminal 37. Point $r$ is then connected through line 265 to terminal 267 of terminal block 35. This voltage pulse may then be passed to the field central 13 as an information pulse.

The wiper 237 then is held at $-50$ volts and line 235 serves to pass information through to the field central. As wiper 237 sweeps about the various scan disc points, $-50$ volts is connected to the associated commutator disc wiper 227 to 211. Moreover, line 235 is connected to wiper 228 which is in continuous contact with the conductive channel 243 of disc 185. The conductive channel 243 is in electrical contact with each conductive portion of the commutator disc 185 (with the exception of channels 206 and 208) through the wedge-shaped portion 245. Due to the operation of the scan disc pointer 237 (the $-50$ volts will appear sequentially on each of the wipers 227 to 211. If the wiper energized with the $-50$ volts is in contact with a conductive portion of the commutator disc 185, the voltage will also be impressed on the wedge 245, conductive channel 243, wiper 228 and the output line 235 to provide an output pulse.

If the particular wiper associated with the scan disc point at which the pointer rests is in contact with a nonconductive portion of the commutator disc, the fifty volts will not be impressed on the output line 235 and no pulse will appear at terminal 267 of terminal block 35. With this operation, binary information is obtained dependent upon the code impressed on commutator disc 185 wherein the presence of −50 volts may be considered a "ONE" and the absence of the −50 volts may be considered a "ZERO".

Upon rotation of the scan disc wiper 237 to point 26, no further output is applied through the commutator disc 185. Consequently, across the scan disc points 26, 27, 28, 29 and 30, no pulses appear at the information terminal 267 and the code transmitted for these five positions of the scan disc pointer 237 may be indicated as "00000". The transmission of these five zeros to the field central 13 may be taken as "end of message" signal indicating that the temperature reading has been completed.

In order to ensure that the end of message signal of "00000" is applied to the field central, the scan disc point 29 is connected to point $m$ of terminal 37. The point $m$, in turn, is connected through the line 251 to one side of the end of message relay EOM. The other side of the end of message relay EOM is connected through a resistor 253 to the common ground line 71. Thus, the end of message relay is activated (shown at 278 in FIGURE 5).

Activation of the end of message relay EOM serves several purposes. Opening of contacts $EOM_1$ prevents pulses from terminal 253 of terminal block 35 from reaching the scan disc motor 191. However, closure of the contacts $EOM_1'$ connects the same scan motor to the source of −50 volts by a connection from the terminal 160 of terminal block 235, line 261, line 269, resistor 393, now closed contacts $EOM_1'$ and line 257, through point $n$ of terminal 37. This application of −50 volts to the scan disc motor 191 assures that the scan disc motor is returned to its home position at point 30.

Opening of contacts $EOM_2$ removes the −50 volts source from the power relay P thereby deenergizing that relay (shown at 280 in FIGURE 5). The −50 volts which energizes the relay EOM also serves to charge the capacitor 397. The other side of the capacitor 397 is connected to ground through resistors 399 and 253.

When the scan disc wiper 237 moves again onto the scan disc point 30, the end of message relay EOM remains energized for a short time during the discharge of the capacitor 397 through the circuit including capacitor 397, closed contacts $EOM_2'$, the coil of relay EOM, and resistor 399. Thus, the end of message relay EOM is retained "on" for a short period of time even after the wiper 237 has passed the scan disc point 29.

Deenergization of the power relay P and the consequent opening of contact $P_1$ causes removal of the −50 volts bias on the base of the transistor 157. With the bias removed, the base of transistor 157 is held positive by the +15 volts through the resistor 400 and lines 401, 181 and 137 to the +15 volt terminal 75 of the terminal block 35. Thus, transistor 157 is turned off. Consequently, the power delay relay PD, which was energized through the collector of transistor 157, is deenergized (shown at 282 of FIGURE 5).

Deenergization of the power delay relay PD causes deenergization of the relays A and B as well as the digitized and scan command relays D and SC, respectively (shown at 284, 286, 288 and 290 in FIGURE 5), since one side of each of these relays was connected to the −25 volt terminal 57 through line 155, contacts $PD_1$ and line 167.

The phase detect relay F is turned off by action of the field central whereby the particular temperature bulb relay TB which has been energized is deenergized by the field central. Deenergization of the temperature bulb relay (shown at 292 in FIGURE 5) TB eliminates the input to bridge circuit 23 whereby no output to the bridge is applied to transformer 111 or to phase detector 27. Thus, there is no output to the AND gate 136, the transistor 141 is conducting and transistors 143, 147 and 149 are all in a non-conducting state. The non-conducting state of the transistor 149 opens the circuit to the phase detect relay F and thereby that relay is deenergized (shown at 294 in FIGURE 5).

Subsequently, the end of message relay EOM is deenergized (shown at 296 in FIGURE 5) due to the completion of discharge of capacitor 397. The time constant of capacitor 397 and resistor 399 is chosen such that the end of message stays "on" for a short period of time sufficient to indicate to the field central station 13 that the temperature reading is complete. This period of time may be equivalent to the end of message code, that is, "00000" and may be considered the time required for the transmission of five bits of information.

While the above description of operation of the circuit has been explained assuming that the commutator disc and scanning potentiometer are on the low side of the balance position, the operation is somewhat similar if the commutator disc begins from the high side of the balance condition. In this case, however, upon inserting the preselected temperature bulb in the bridge circuit, the output of the bridge circuit 23 will be out of phase with the reference signal across resistor 133 and there will be no output from the AND gate 136. Consequently, the phase control relay F will not be activated at that time. With the phase control relay F in its deenergized condition, the shading pole 195 of the commutator disc motor 189 will be shorted out rather than the shading pole 197 as is the case in the previous explanation. With the different shading pole being shorted out, the rotation of the motor will be in the opposite direction as indicated by the portion of the curve 403 (FIGURE 5) on crossing the null point 321; however, the output of the bridge circuit 323 will be in phase with the reference signal and the phase detect relay will be energized (shown at 260a in FIGURE 5). Energization of the F relay will cause the short across the shading pole 195 to be removed and the short placed across the shading pole 197.

Thus, after a certain amount of coast by the commutator disc motor 189, as shown by portion 405 in the curve in FIGURE 5, the motor will reverse direction and travel along the portion of the curve 407. Moreover, energization of the F relay will cause the A relay to be energized through the contacts $F_1'$ (shown at 266a of FIGURE 5). When the commutator disc and scanning potentiometer again cross the balance position (this time from the lower side), the F relay is again turned off (shown at 268a of FIGURE 5). From this point onward, the operation of the circuit is identical as in the previous example.

Figure 8:
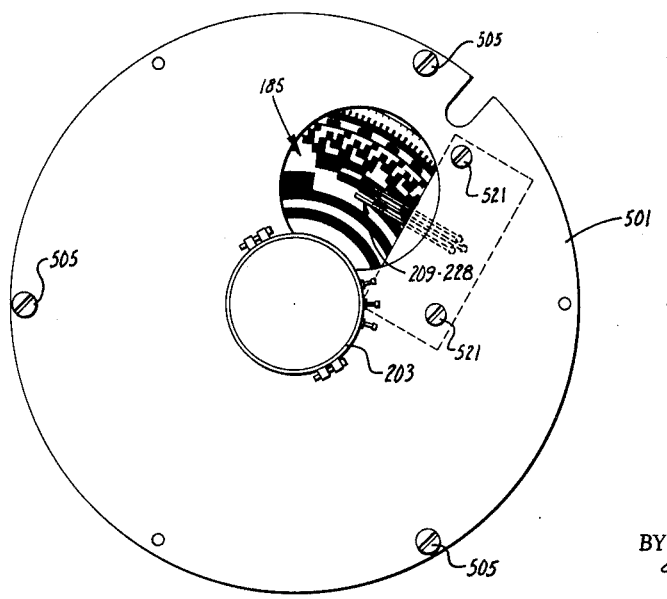
FIGURE 8 is a top view of the mechanism shown in FIGURE 6.
Figure 6:
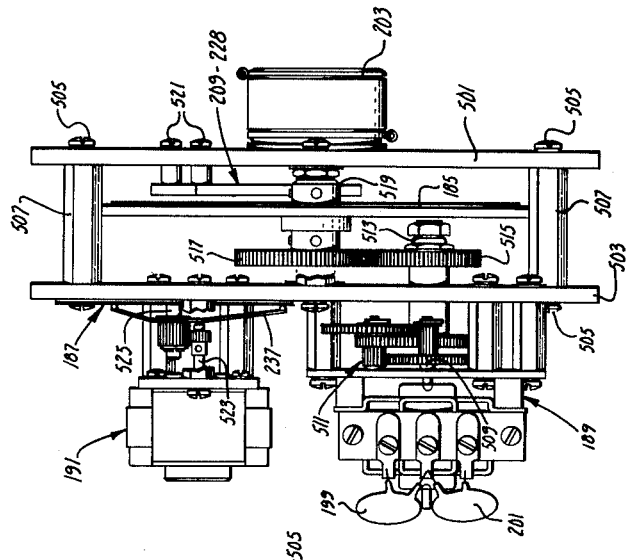
FIGURE 6 is an elevational view of the mechanism employed for rotating the commutator and scanning discs.
Figure 7:
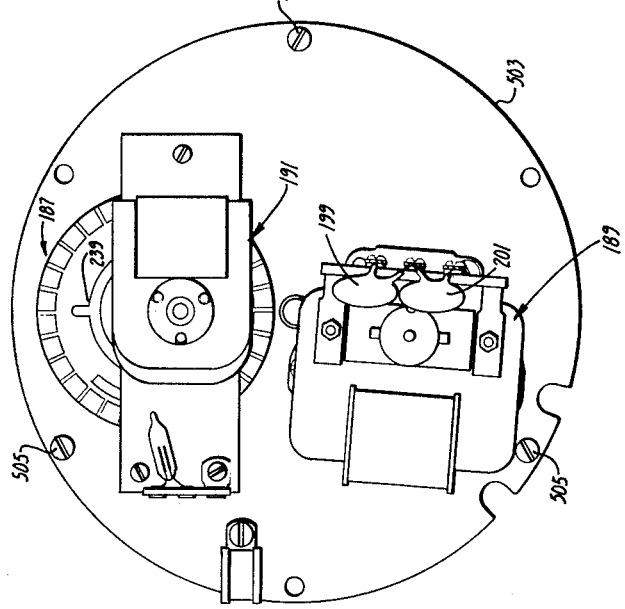
FIGURE 7 is a bottom view of the mechanism shown in FIGURE 6.

Referring to FIGURES 6, 7 and 8, the mechanical portion of a temperature encoder in accordance with this invention is shown. The encoder includes a top plate 501 and a bottom plate 503 held in spaced relationship by a plurality of bolts and spacers 505 and 507, respectively. The commutator disc motor 189 is mounted on the bottom plate 503 with its shaft 509 being connected through a gear train 511 to a reduced speed shaft 513. The reduced speed shaft 513 has a gear 515 thereon in mesh with a gear 517 which is on a shaft 519 common to both the commutator disc 185 and the calibrated potentiometer 203. The wipers 209 to 228 are shown representatively in FIGURES 6 and 8 and are connected to the top plate 501 by means of screws 521.

The scan disc motor 191 is mounted on the bottom plate 503 and has its shaft 523 connected by gears to a shaft 525 journalled in the bottom plate 503. The scan disc pointer 237 is secured to the shaft 525 for rotation about the scan disc 187.

Thus, it is seen that a system for converting analog readings into digital information is provided which is compatible with existing equipment such as that described in said copending application Serial No. 100,920. In the system described, operation is initated by selecton at the field central of a temperature bulb to be read. The system employs a single bridge circuit and a single scanning potentiometer to measure several unknown values. The use of the commutator disc together with the scan disc permits serial pulse readout of parallel information.

The system described employs several advantageous features including an economical reversible motor to drive the scanning potentiometer and commutator disc. The reversible motor is employed to balance a bridge circuit in such a manner that final balance is always approached from the same direction. The motor is driven with two speeds and the final balance is always approached at the low speed whereby inertial drift is minimized.

Moreover, the described system includes means for indicating ambiguous readings of the commutator disc and for using these indications to prevent information transmission until the ambiguity is cleared.

I claim:

1. An encoder unit, comprising, in combination:
    a bridge circuit having an analog variable element in one leg and a scanning variable element in another leg;
    means for applying an alternating current input to said bridge circuit producing an output signal which is a phase determination of the relationship between said analog and scanning variable elements;
    a reference source having the same frequency as said alternating current input for producing a signal including an alternating current component and a direct current component;
    means for modifying said last-mentioned signal to produce a reference signal in the form of short pulses separated by times substantially longer than the time width of the pulses;
    means for comparing the phase relationship of said reference source with the output of said bridge circuit and providing an output signal only when the phase of said reference signal and said bridge output signal is a first predetermined relationship;
    multiple speed reversible motive means coupled to said comparing means for driving said scanning variable element;
    circuit means operable to initiate the operation of said motive means at high speed and causing said motive means to continue operating at high speed until the phase relationship between said reference signal and said bridge output signal changes from said first predetermined relationship to a second predetermined relationship, said second predetermined relationship being indicated by a lack of an output signal from said comparing means; and
    analog-to-digital conversion means connected to said motive means for providing a digital output indicative of the position of said scanning variable element.

2. An encoder as defined in claim 1 wherein said conversion means comprises
    a coded commutator disc and sensing means in cooperative relationship therewith, the relative position of said sensing means to the commutator disc being responsive to the position of said scanning variable element;
    said commutator disc having digital information along increments thereof, said digital information at that portion of the disc in cooperation with the sensing means being in correspondence with the analog information to be read, wherein the adjacent portion of the disc includes different digital information;
    means cooperating with said disc for determining when the relative position of said sensing means and the disc is such to indicate an ambiguous reading, said last-named means including a channel on said disc, said channel having portions thereon corresponding to and indicative of said ambiguous reading areas;
    means responsive to the portions corresponding to the ambiguous reading areas for continuing the energization of said motive means until a non-ambiguous reading area is in cooperation with said sensing means; and
    means for stopping said motive means upon the cooperation of said sensing means with a non-ambiguous reading area.

3. A system for providing an indication of a condition at a plurality of locations, comprising, in combination:
    a plurality of condition-responsive analog variable elements;
    a field central unit capable of selecting any one of said variable elements for a reading thereof;
    an encoder unit comprising:
        a bridge circuit having a selected analog variable element in one leg and a scanning variable element in another leg,
        said bridge circuit providing an alternating current output signal when said elements are of unequal values,
        a voltage source producing a signal having an alternating current component and a direct current component,
        means for modifying said last-mentioned signal to produce a reference signal in the form of short pulses separated by times substantially longer than the time width of the pulses,
        means for comparing the phase of said reference signal with the phase of said bridge output signal and producing an output signal only when the phase of said reference signal and said bridge output signal is a first predetermined relationship,
        a multiple speed reversible motor coupled to said comparing means for adjusting said scanning variable element,
        circuit means for initiating the operation of said motor at high speed and causing said motor to continue operating at high speed until the phase relationship between said reference and bridge output signals changes from the first predetermined relationship to a second predetermined relationship, said second predetermined relationship being indicated by a lack of an output signal from said comparing means, and
        analog-to-digital conversion means coupled to said motor for providing a digital output signal; and
    means for transmitting said digital signal to a single control station for viewing by an observer.

4. An encoder unit as defined in claim 1 wherein said analog variable element is a variable resistive element and said scanning variable element is a potentiometer.

5. An encoder as defined in claim 1 wherein said means for comparing the phase relationship of said reference source with the output of said bridge circuit comprises an AND gate.

6. An encoder as defined in claim 1 together with means responsive to the change from said first predetermined relationship to said second predetermined relationship for slowing said motive means and for reversing its direction whereby the motive means causes said scanning variable element to approach the point of phase change at low speed and always from the same direction.

7. An encoder as defined in claim 2 together with means responsive to the stopping of said motive means for reading the digital information at that portion of the commutator disc in cooperation with the sensing means.

8. A system as defined in claim 3 wherein said analog variable element is a variable resistive element.

9. A system as defined in claim 8 wherein said variable resistive element is temperature responsive.

10. A system as defined in claim 3 wherein said means for comparing the phase of the reference signal with the output of said bridge circuit comprises an AND gate.

11. A system as defined in claim 3 together with means responsive to the change from said first predetermined relationship to said second predetermined relationship for slowing said motor and for reversing its direction whereby the motor causes said scanning potentiometer to approach the point of phase change at low speed and always from the same direction.

References Cited by the Examiner

UNITED STATES PATENTS

| | | | |
|---|---|---|---|
| 2,674,707 | 4/1954 | DeMott | 318—29 |
| 2,806,193 | 9/1957 | Koppel | 318—29 |
| 2,880,410 | 3/1959 | Postman | 340—347 |
| 2,972,106 | 2/1961 | Hyrne | 318—29 |
| 3,046,461 | 7/1962 | Luppold | 318—29 |

MALCOLM A. MORRISON, *Primary Examiner.*